United States Patent [19]

Treadaway

[11] 4,189,866

[45] Feb. 26, 1980

[54] POLYMER-OPTICAL BRIGHTENER COMBINATIONS IN TRANSPARENT FILM FORM USEFUL AS GLAZING MATERIALS CAPABLE OF MODIFYING PLANT GROWTH RATE

[75] Inventor: Michael F. Treadaway, Skelmersdale, England

[73] Assignee: The British Petroleum Company Limited, London, England

[21] Appl. No.: 763,592

[22] Filed: Jan. 28, 1977

[30] Foreign Application Priority Data

Jan. 30, 1976 [GB] United Kingdom ................. 3741/76

[51] Int. Cl.$^2$ ....................... B32B 27/06; B32B 27/18; B32B 27/32; C09K 11/06; F21V 9/16
[52] U.S. Cl. ........................................... 47/58; 8/1 W; 47/17; 47/29; 47/DIG. 6; 252/301.32; 428/522; 428/523; 525/3
[58] Field of Search ................. 47/DIG. 6, 17, 58, 29; 428/522, 523; 260/45.75; 252/301.32; 8/1 W; 526/3

[56] References Cited

U.S. PATENT DOCUMENTS

| | | | |
|---|---|---|---|
| 2,190,890 | 2/1940 | Sellei | 47/DIG. 6 |
| 2,222,225 | 11/1940 | Green | 47/DIG. 6 |
| 3,043,709 | 7/1962 | Amborski | 47/DIG. 6 |
| 3,089,280 | 5/1963 | Klaas | 47/DIG. 6 |
| 3,095,421 | 6/1963 | Liechti et al. | 260/307 D |
| 4,048,367 | 9/1977 | Carlsson et al. | 428/395 |

FOREIGN PATENT DOCUMENTS 947981  1/1964  United Kingdom ................ 260/307 D

OTHER PUBLICATIONS

Modern Plastics Encyclopedia, McGraw-Hill, New York, 44 (1A), pp. 491–493 and 509, (1966).

Primary Examiner—J.C. Cannon
Attorney, Agent, or Firm—Brooks, Haidt, Haffner & Delahunty

[57] ABSTRACT

This invention relates to a polymeric material having incorporated therein, 2,5-di-(5-tert-butyl-2-benzoxazolyl) thiophene for use as a substance transmissive to visible light.

4 Claims, No Drawings

POLYMER-OPTICAL BRIGHTENER COMBINATIONS IN TRANSPARENT FILM FORM USEFUL AS GLAZING MATERIALS CAPABLE OF MODIFYING PLANT GROWTH RATE

The present invention relates to a polymeric material and in particular to such material treated to alter its chemical and/or physical properties which makes it suitable in the form of sheets or films as growth-forcing and protective coverings for growing plants.

It is known that polymeric materials such as polyvinyl chloride (PVC) or polyethylene may be treated with substances such as scintillators which alter certain of the wave lengths of the light transmitted by the material. By selection of the particular substances used it is possible to produce a material in which the UV component of solar radiation is transferred to certain visible wavelengths. The overall effect is to increase the total visible component of the transmitted light. Films containing such scintillators find particular application in covering or glazing materials for greenhouses or cloches, whereby its use forces growth of plants, e.g. fruit or vegetables placed under it. The polymeric material may be treated by direct compounding of the substance in the polymer composition, or by surface coating of the fabricated polymer, e.g. as sheet or film with a medium containing the active substance. Whatever method is employed, it has been found that the wave length shifting characteristics of the treated polymer is not permanent and decays with time, e.g. over a period of several weeks (see Table 1). For viable commercial use it is necessary to provide a material in which the decay of the wave length shifting property is prevented or is at least retarded for a period at least as long as the plant growing season.

Accordingly, the present invention is a polymeric material transmissive to visible light comprising a polymer substrate and 2,5-di-(5-tert-butyl-2-benzoxazolyl) thiophene.

The 2,5-di-(5-tert-butyl-2-benzoxazolyl) thiophene (hereinafter referred to as the "active substance") may be combined with the polymer substrate in any convenient manner. Thus the polymer may be physically admixed by, for example, tumbling pellets or flakes of the polymer with the active substance alone or contained in a suitable vehicle followed by extrusion or other physical fabrication of the mixture. Alternatively the polymer may be fabricated for example as sheet or film, the surfaces of which are then coated with the active substance. A prepared surface coating may be conveniently obtained by incorporating the active substances into a surface finishing composition usually comprising calcium stearate or stearic acid which itself coats the surfaces of newly formed polymer sheet or film during extrusion. The amount of active substance employed is usually such as to provide from about 0.01 to 0.5% by weight based on the weight of the polymer substrate.

Suitable polymeric substrates are, for example, PVC, polyethylene, or ethylene copolymers such as ethylene vinyl acetate copolymer.

It has also been found that the addition of a hydroperoxide scavenger increases the life and stability of the "active substance". Suitable hydroperoxide scavengers include DLTDP (di-lauryl-3-3-thiodipropionate), trithioalkyl phosphite and metal chelated thiocarbamates.

Such hydroperoxide scavengers may be used in amounts ranging from 0.05–1% preferably between 0.2–0.7% by weight based on the weight of the polymer substrate.

Such additives are preferably used in conjunction with polyethylene films and ethylene copolymer films.

The polymer substrates of the present invention may contain other conventional antioxidants and general stabilizers. It is, however, essential that such antioxidants and stabilizers used do not absorb in the UV region since they are likely to compete with the active substance. Thus a preferred antioxidant may be Irganox 1076 (Regd. Trade Mark).

In addition, deactivants and free radical scavengers which are capable of increasing the natural life time of the active substance such as sterically hindered amino group containing compounds, e.g. TINUVIN 770 (Regd. Trade Mark) may be incorporated in the polymeric film. These deactivants are preferably used in quantities ranging from 0.01% to 3.0% by weight based on the weight of the polymer.

The polymeric material of the invention exhibits the wave length shifting characteristics for a period longer than treated polymers used hitherto. Films or sheets fabricated from such material may be used to replace glass conventionally used as the glazing material for greenhouses, cloches, etc. with the advantage that the polymeric material may be supported by lighter and cheaper structures.

The polymeric material according to the present invention is described further with reference to the following Examples.

EXAMPLE 1

Low density polyethylene pellets were tumble mixed with 0.3% of the active substance and extruded as rod, pelleted and blown into film using conventional film blowing techniques.

EXAMPLE 2

A mixture of 30% of the active substance in calcium stearate was melted together, cooled and the resulting block broken into small chips. These chips were tumble mixed with low density polyethylene, in the ratio 1/100, and blown into film using conventional film blowing techniques.

EXAMPLE 3

The following:

| | | |
|---|---|---|
| PVC | 105 | parts |
| Plasticiser | 30 | parts |
| Epoxidised soya bean oil | 4 | parts |
| Stabilizer | 5 | parts |
| Lubricant | 1.6 | parts |
| Active substance | 0.5 | parts | were mixed in a high speed mixer to produce a powder compound, gelled on an open mill, cut into strips, and blown into film using normal blowing conditions.

EXAMPLE 4

Ethylene-vinyl acetate copolymer pellets, containing 4% vinyl acetate, were tumble mixed with a pellet masterbatch of the following composition:

| | |
|---|---|
| Active substance | 1.8% |

-continued

| Tinuvin 770 | 1.8% |
| DLTNP | 1.8% |
| Irganox 1076 | 0.6% |
| Ethylene (4% vinyl acetate) copolymer | Remainder |

The pellets were mixed in the proportion ethylene vinyl acetate copolymer:masterbatch of 5:1.

The resulting mix was blown into fim using normal film blowing conditions.

EXAMPLE 5 (LIFE OF SCINTILLATOR)

In order to determine the decay of the wavelength shifting characteristic of the active substance samples were irradiated in a Xenotest. One day in the Xenotest is equivalent to about 20 days of winter conditions in the field. The light intensities of the exposed films were measured on a SP900 spectrometer manufactured by Pye Unicam. The life of the BBOT in various formulations in given in Table 1.

EXAMPLE 6

A greenhouse was constructed using the polymer film described in Example 1. A control greenhouse was constructed from the same polymer film but which did not contain the active substance. Both greenhouses were planted with Chinese Cabbage seedlings early in March, 1976. The crop yields are given in Table 2. The crops grown under the polymer film containing the active substance show a marked increase in yield.

TABLE 1

LIFE OF SCINTILLATOR BBOT* IN POLYMER FILMS TESTED ON A XENOTEST (1 h in Xenotest = ~ 20 h in a field under winter conditions)

| Polymer Film | Life of Scintillator h | | |
|---|---|---|---|
| | ⅛ life | ¼ life | ½ life |
| Low density polyethylene | 22 | 46 | 89 |
| Low density polyethylene plus stabilisers** | 46 | 115 | 245 |
| Ethylene vinyl acetate copolymer (76 per cent vinyl acetate) | 96 | 245 | >500 |
| Ethylene vinyl acetate copolymer (8 per cent vinyl acetate) | 91 | 192 | >500 |

TABLE 1-continued

LIFE OF SCINTILLATOR BBOT* IN POLYMER FILMS TESTED ON A XENOTEST (1 h in Xenotest = ~ 20 h in a field under winter conditions)

| Polymer Film | Life of Scintillator h | | |
|---|---|---|---|
| | ⅛ life | ¼ life | ½ life |
| Ethylene vinyl acetate copol (8 per cent vinyl acetate) plus stabilisers** | 148 | 380 | >500 |
| Ethylene vinyl acetate copolymer (4 per cent vinyl acetate) | 36 | 80 | — |
| Ethylene vinyl acetate copolymer (4 per cent vinyl acetate) plus stabilisers** | 60 | 144 | — |

*-2,5-di-(5-tert-butyl-2-benzoxazolyl)thiophene
**Stabilisers - 0.3 per cent Tinuvin 770, 0.3 per cent Dilaurylthiodipropionate and 0.1 per cent Irganox 1076.

TABLE 2

YIELD OF CHINESE CABBAGE

| Variety | Mean Wt/Head kg | |
|---|---|---|
| | Control Plastic | Plastic Containing Active Substance |
| Springtime | 0.74 | 0.79 |
| Tip Top | 0.72 | 0.81 |
| Sampan | 0.71 | 0.75 |
| Spring Al | 0.58 | 0.71 |
| Mean | 0.69 | 0.77 |

I claim:

1. A process for promoting the growth of plant life which comprises subjecting said plant to visible light transmitted through a polymeric material comprising a polymer selected from the group consisting of polyvinyl chloride, polyethylene and copolymers of ethylene; a hydroperoxide scavenger, and 2,5-di(5-tert-butyl-2-benzoxazolyl) thiophene.

2. A process as defined in claim 1 wherein the hydroperoxide scavenger is selected from the group consisting of dilauryl-3,3-thiodipropionate, trithioalkyl phosphite and metal chelated thiocarbamates.

3. A polymeric material transmissive to visible light comprising a polymer substrate selected from the group consisting of polyvinyl chloride, polyethylene and ethylene copolymer and a surface coating thereon comprising 2,5-di-(5-tert-butyl-2-benzoxazolyl) thiophene and a hydroperoxide scavenger.

4. A polymeric material according to claim 3 wherein the surface coating is obtained by incorporating the 2,5-di-(5-tert.-butyl-2-benzoxazolyl)thiophene into a surface finishing composition selected from stearic acid or calcium stearate.

* * * * *